A. O. CURRY.
FLUID PRESSURE RELEASING VALVE.
APPLICATION FILED DEC. 27, 1913.
1,120,452.
Patented Dec. 8, 1914.
2 SHEETS—SHEET 2.
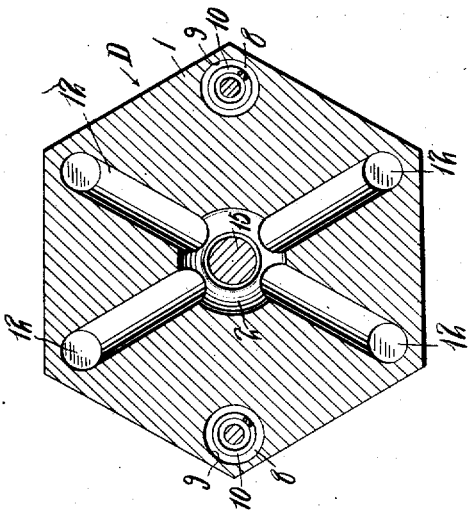
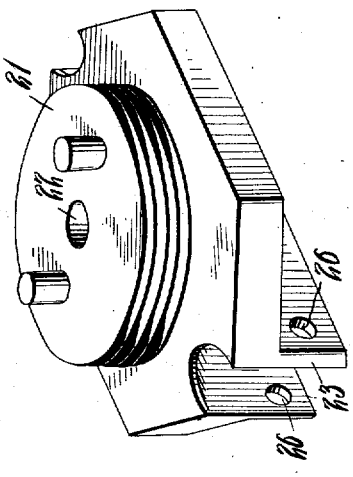
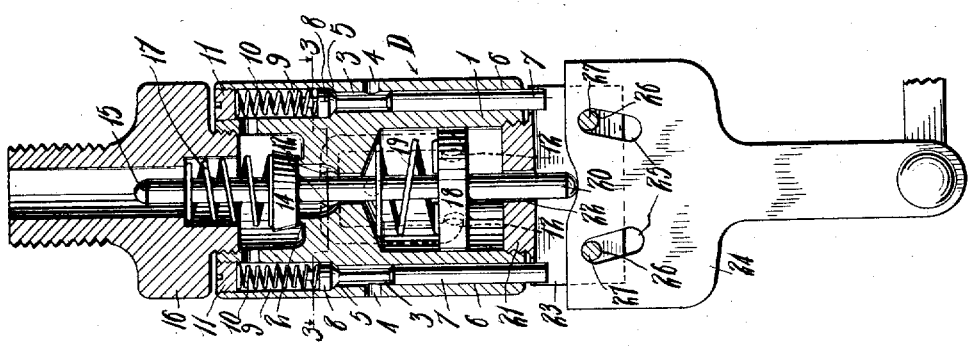
Witnesses
W. C. Fielding
John J. McCarthy
Inventor
A. O. Curry,
By Victor J. Evans
Attorney
THE NORRIS PETERS CO., PHOTO-LITHO., WASHINGTON, D. C.

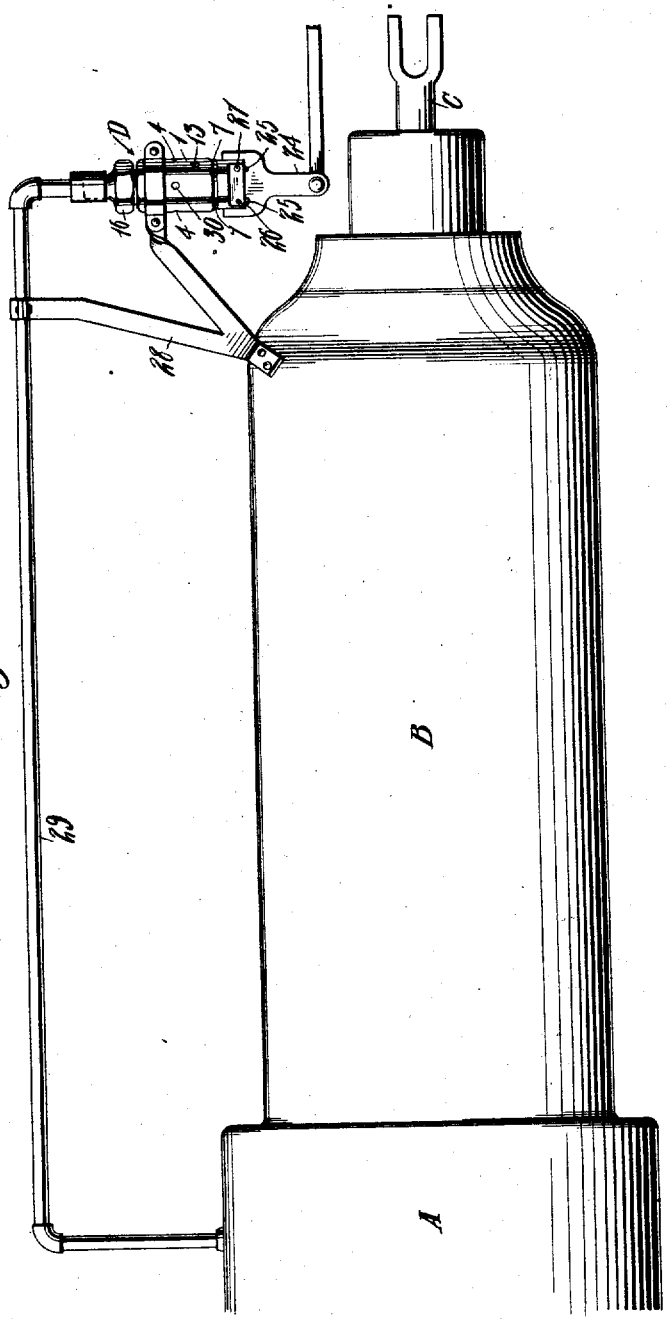

UNITED STATES PATENT OFFICE.

ARTHUR O. CURRY, OF SAN BERNARDINO, CALIFORNIA.

FLUID-PRESSURE-RELEASING VALVE.

1,120,452.  Specification of Letters Patent.  Patented Dec. 8, 1914.

Application filed December 27, 1913. Serial No. 809,055.

*To all whom it may concern:*

Be it known that I, ARTHUR O. CURRY, a citizen of the United States, residing at San Bernardino, in the county of San Bernardino and State of California, have invented new and useful Improvements in Fluid-Pressure-Releasing Valves, of which the following is a specification.

This invention relates to improvements in fluid pressure release valves and has particular application to a bleed valve for releasing the pressure in the auxiliary reservoir and brake cylinder of an air brake system. It will be understood, however, that my improved valve in its useful application is not limited to this particular purpose, as the same may be employed wherever it is desired to release a fluid under pressure.

In carrying out the present invention, it is my purpose to provide a manually operable bleed valve whereby the pressure in the auxiliary reservoir and brake cylinder may be released whenever necessary in order to insure the release of the brakes and wherein the valve will be automatically maintained in open position during the bleeding operation.

It is also my purpose to provide a valve of the class described which may be opened manually and which will be automatically held open by the pressure of the fluid escaping to the atmosphere so that immediately succeeding the reduction in pressure the valve may close.

Furthermore, I aim to provide a valve of the type set forth which will embrace the desired features of simplicity, efficiency and durability, one which may be installed and maintained at a minimum expense and one which may be operated with ease and convenience.

With the above and other objects in view, the invention consists in the construction, combination and arrangement of parts hereinafter set forth in and falling within the scope of the claims.

In the accompanying drawings; Figure 1 is a view in side elevation of a brake cylinder and a portion of an auxiliary reservoir equipped with a pressure releasing valve constructed in accordance with the present invention. Fig. 2 is a vertical sectional view through the valve showing the parts on an enlarged scale. Fig. 3 is a horizontal sectional view on the line 3—3 of Fig. 2. Fig. 4 is a perspective view of the lever support. Fig. 5 is a perspective view of one of the testing valves.

Referring now to the drawings in detail, A designates an auxiliary reservoir, B a brake cylinder communicating with the reservoir and C the piston rod connected with the piston working in the brake cylinder. These parts may be of any desired or conventional type and, in the present instance, the auxiliary reservoir is connected directly to the brake cylinder.

My improved release valve is designated as an entirety by the letter D and, in the present instance, comprises a metallic casing 1 equipped interiorly, adjacent to the upper end thereof, with a valve seat 2. Formed in the casing 1 at diametrically opposite points are vertical passages 3, 3 each having the upper end thereof communicating with the interior of the casing above the valve seat 2 and the lower end thereof opening into the atmosphere through the side wall of the casing as at 4. Formed in each passage 3 adjacent to the lower end thereof is a valve seat 5, while formed in the casing coaxial with each passage is a bore 6 opening onto the lower end of the casing. Slidably mounted within each bore and equipped adjacent to its inner end with a valve disk 8 designed to engage the respective seat 5 is a stem 7. In the present instance, bores 9 are formed in the casing contiguous to the upper ends of the passages 3, 3 and mounted within the bores and passages are coiled expansion springs 10 having the lower ends thereof engaging the valve disks 8 and the upper ends seating against plugs 11 closing the bores 9, such springs acting to maintain the valve disks 8 seated. Formed in the casing 1 are vertical passages 12 spaced equal distances apart and having the upper ends thereof opening into the valve seat 2 and the lower ends opening into the casing adjacent to the bottom thereof, while formed in the casing at a point above the lower ends of the passages 12 is an exhaust aperture 13. Engaging the valve seat 2 is a valve disk 14 provided with a stem 15 extending above and below the seat, while threaded into the upper end of the casing is a nipple 16 and interposed between the lower end of the nipple and the upper face of the valve is a coiled expansion spring 17 acting upon the valve to hold the latter normally in engagement with its seat. Mounted within the lower portion of the casing 1 and capable of sliding movement therein is a disk 18 adapted to engage the lower end of the valve stem 15 and normally held spaced apart from such end of the stem by means of an expansion spring 19 interposed between the under surface of the valve seat 2 and the upper surface of the disk 18. Threaded into the lower end of the casing 1 is a block 21 formed centrally with an aperture 22 through which the stem 20 passes, while formed on the lower face of the block 21 and depending therefrom are ears 23, 23 spaced apart and disposed at opposite sides of the stem 20, the lower ends of the stems 7 being disposed at the opposite ends of the space between the ears. Mounted between the ears 23 and capable of rocking movement is a lever 24 formed adjacent to the opposite sides thereof with slots 25 registering with apertures 26 formed in the ears to receive pivot pins 27. The lower end of the lever is connected with any suitable well known manually controlled operating mechanism.

In practice, the valve D is supported upon a suitable bracket 28 carried by the brake cylinder B and the nipple 16 is connected up with the auxiliary reservoir A by means of a pipe 29, or the nipple 16 may be threaded into the auxiliary reservoir A as desired. Should the brakes fail to release for any reason, the lever 24 is rocked and in the initial rocking movement thereof the disk 18 is moved inwardly of the casing against the action of the spring 19 and into engagement with the lower end of the valve stem 15, incident to the lever 24 engaging the stem 20 on the disk 18. In the continued rocking movement of the lever 24, the disk 18 and valve stem 15 are carried inwardly thereby moving the valve disk 14 out of engagement with the seat 2 against the action of the spring 17. The air now passes through the pipe 29, valve seat 2 and into the atmosphere by way of ports 30 formed in the side walls of the casing immediately below the valve seat. Simultaneously with the discharge of the air into the atmosphere a portion of such air passes through the passages 12 and beneath the disk 18 thereby maintaining the latter elevated against the action of the springs 17 and 19 and the pressure on the upper side of the valve disk 14, the lower surface of the disk 18 being of a greater area than the valve disk 14. As the air enters the space below the disk 18 by way of the plurality of passages 12, such air is gradually discharged into the atmosphere by way of the exhaust aperture 13, but as the diameter of the latter is the same as the diameter of each of the passages 12 and as there is a plurality of passages 12 it will be seen that the proper pressure is at all times maintained upon the lower side of the disk 18. Succeeding the exhausting of the air from the auxiliary reservoir and the brake cylinder, the pressure on the under side of the disk 18 is relieved thereby permitting the latter to gravitate to lowered position and the valve disk 14 to engage the seat 2. On the other hand, when it is desired to test the auxiliary reservoir the lever 24 is swung in one direction or the other and engages the lower end of one of the stems 7 thereby sliding the latter within the bore 6 to disengage the valve 8 from the seat 5 whereby the air flows from the auxiliary reservoir through the pipe 29, the upper portion of the casing 1 and the passage 3 into the atmosphere at 4.

From the foregoing description taken in connection with the accompanying drawings, the construction, mode of operation and manner of employing my improved pressure releasing valve will be readily apparent. It will be seen that I have provided a valve which is especially useful in bleeding the auxiliary reservoirs and brake cylinders of air brake systems and wherein the valves will be automatically held open by the pressure of the air from the cylinder and reservoir. Furthermore, it will be noted that the pressure within the auxiliary reservoir may be tested at any time.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. The combination with a source of fluid under pressure, of a valve for releasing the same, fluid operated means for maintaining said valve in open position, an auxiliary valve associated with said first valve whereby the pressure of the fluid may be tested, and manually operable means for operating said valves.

2. The combination with a source of fluid under pressure, of a valve for releasing the same, fluid operated means for maintaining said valve in open position, an auxiliary valve associated with said first valve whereby the pressure of the fluid may be tested, and manually operable means common to both valves for operating the same.

3. In air brake mechanism, the combination with an auxiliary reservoir, of a bleed valve therefor, manually operable means for opening said valve, means operable from the pressure of the fluid in said reservoir to maintain said valve in open position succeeding the operation of said manual means, and an auxiliary valve associated with said first valve whereby the pressure in said reservoir may be tested.

4. The combination with a source of fluid under pressure, of a valve for relieving the same comprising a casing having a valve seat formed therein approximately centrally thereof, passages each communicating at one end with the valve seat and opening into the casing below the seat, exhaust ports, a valve normally engaging said seat, a stem on said valve, a disk slidably mounted within the casing below the valve seat, means for sliding said disk into engagement with said stem to open the valve and uncover the lower ends of said passages whereby the fluid under pressure will be released and the disk held elevated to maintain the valve open, and a spring acting upon said disk to restore the same to normal position succeeding the reduction of the pressure of the fluid.

5. The combination with a source of fluid under pressure, of a valve for relieving the same comprising a casing having a valve seat formed therein approximately centrally thereof, passages each communicating at one end with the valve seat and opening into the casing below the seat, exhaust ports, a valve normally engaging said seat, a stem on said valve, a disk slidably mounted within the casing below the valve seat, means for sliding said disk into engagement with said stem to open the valve and uncover the lower ends of said passages whereby the fluid under pressure will be released and the disk held elevated to maintain the valve open, and an auxiliary valve carried by said casing whereby the pressure of the fluid may be tested independently of the operation of said first valve.

6. The combination with a source of fluid under pressure, of a valve for releasing the same, means for maintaining said valve in open position, an auxiliary valve associated with said first valve whereby the pressure of the fluid may be tested, and means for operating said valves.

7. The combination with a source of fluid under pressure, of a valve for releasing the same, means for maintaining said valve in open position, an auxiliary valve associated with said first valve whereby the pressure of the fluid may be tested, and manually operable means for operating said valves.

In testimony whereof I affix my signature in presence of two witnesses.

ARTHUR O. CURRY.

Witnesses:
J. C. Amos,
M. T. Amos.

Copies of this patent may be obtained for five cents each, by addressing the "Commissioner of Patents, Washington, D. C."